United States Patent
Takamatsu et al.

(10) Patent No.: US 8,911,112 B2
(45) Date of Patent: Dec. 16, 2014

(54) LIGHT EMITTING ELEMENT ADJUSTING AND FIXING STRUCTURE, OPTICAL SCANNER, AND IMAGE FORMING APPARATUS

(75) Inventors: Shuji Takamatsu, Zama (JP); Atsumi Komatsuda, Zama (JP)

(73) Assignee: Ricoh Company, Ltd., Tokyo (JP)

( * ) Notice: Subject to any disclaimer, the term of this patent is extended or adjusted under 35 U.S.C. 154(b) by 435 days.

(21) Appl. No.: 13/349,960

(22) Filed: Jan. 13, 2012

(65) Prior Publication Data

US 2012/0182735 A1 Jul. 19, 2012

(30) Foreign Application Priority Data

Jan. 14, 2011 (JP) ................. 2011-006352
Jan. 25, 2011 (JP) ................. 2011-013461

(51) Int. Cl.
*F21V 19/02* (2006.01)
*G03G 15/04* (2006.01)
*G02B 26/12* (2006.01)
*G03G 15/32* (2006.01)

(52) U.S. Cl.
CPC ........ *G03G 15/04036* (2013.01); *G02B 26/124* (2013.01); *G03G 15/326* (2013.01)
USPC ....................... 362/249.1; 362/285

(58) Field of Classification Search
CPC ........... B41J 2/44; G02B 26/10; H04N 1/036; H01S 5/022; G03G 15/326; G03G 15/04036; F21V 19/02
USPC .............. 362/233, 239, 241, 249.1, 250, 287, 362/285
See application file for complete search history.

(56) References Cited

U.S. PATENT DOCUMENTS

2005/0007781 A1* 1/2005 Okuwaki et al. .............. 362/259
2008/0117297 A1 5/2008 Torres

FOREIGN PATENT DOCUMENTS

| CN | 2808245 Y | 8/2006 |
|---|---|---|
| CN | 201163005 Y | 12/2008 |
| CN | 201688191 U | 12/2010 |
| JP | 10-10447 | 1/1998 |
| JP | 10-319338 | 12/1998 |
| JP | 11-58829 | 3/1999 |

(Continued)

OTHER PUBLICATIONS

Combined Office Action and Search Report issued Feb. 11, 2014 in Patent Application No. 201210031838.8 (with English translation).

(Continued)

*Primary Examiner* — Andrew Coughlin
(74) *Attorney, Agent, or Firm* — Oblon, Spivak, McClelland, Maier & Neustadt, L.L.P.

(57) ABSTRACT

A light emitting element adjusting and fixing structure includes a light emitting element having a plurality of light emitting points is fixed to a housing with a holding member. The housing includes a mounting hole having a reference plane to which the light emitting element is mounted, and a holding portion for holding the holding member such that the light emitting element can be rotated in contact with the reference plane. A distance between the adjacent light emitting points in a projection plane of the light emitting points can be adjusted by rotationally adjusting the light emitting element with respect to an optical axis in a state in which the holding member is held by the holding portion, and then fixing the light emitting element to the housing.

15 Claims, 18 Drawing Sheets

(56) References Cited

FOREIGN PATENT DOCUMENTS

| | | |
|---|---|---|
| JP | 11-72728 | 3/1999 |
| JP | 2000-89147 | 3/2000 |
| JP | 2001-13432 | 1/2001 |
| JP | 2001-296490 | 10/2001 |
| JP | 2002-169115 | 6/2002 |
| JP | 2005-24721 | 1/2005 |
| JP | 2007-50540 | 3/2007 |
| JP | 2008-268239 | 11/2008 |
| JP | 2010-72185 | 4/2010 |
| JP | 2010-175712 | 8/2010 |

OTHER PUBLICATIONS

Office Action issued May 20, 2014 in Japanese Patent Application No. 2011-013461.

Office Action issued May 20, 2014 in Japanese Patent Application No. 2011-006352.

* cited by examiner

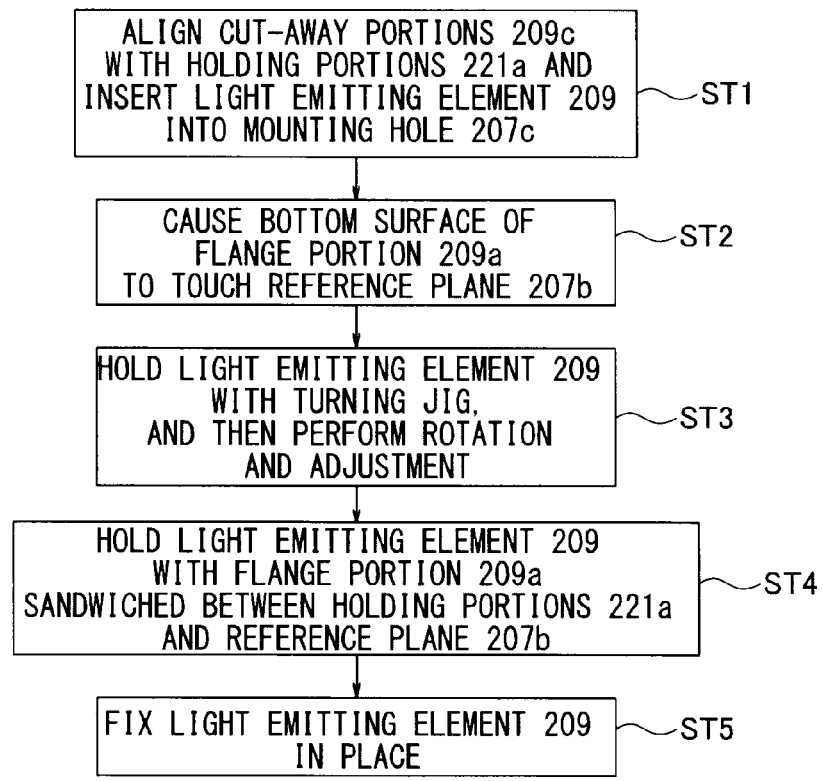
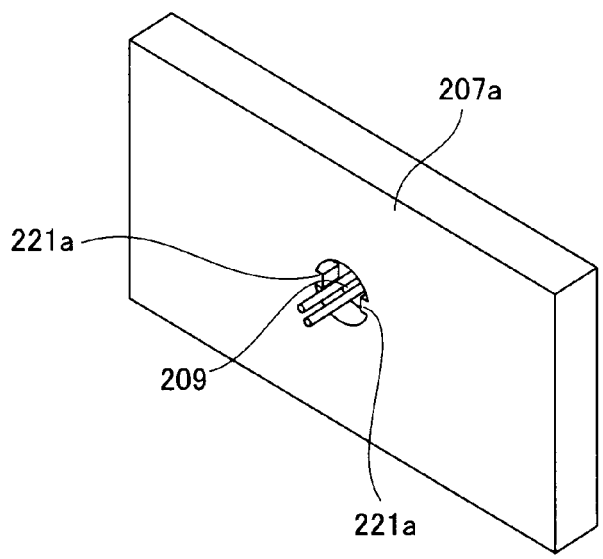

LIGHT EMITTING ELEMENT ADJUSTING AND FIXING STRUCTURE, OPTICAL SCANNER, AND IMAGE FORMING APPARATUS

CROSS-REFERENCE TO THE RELATED APPLICATION

This application is based on and claims the priority benefit of each of Japanese Patent Application Nos. 2011-006352, filed on Jan. 14, 2011 and 2011-013461, filed on Jan. 25, 2011 the disclosure of which is incorporated herein by reference in its entirety.

BACKGROUND OF THE INVENTION

1. Field of the Invention

The present invention relates to an optical scanner to be used in a writing optical system of an image forming apparatus such as a digital copier or a laser printer, and particularly to a technique for positioning and fixing a light emitting element having a plurality of light beams.

2. Description of the Related Art

Heretofore, image forming apparatuses have been widely known in which lasers are used as light sources in electrophotographic image formation. As a technique for adjusting the pitch of beams emitted from a plurality of laser diodes, the following technique has been disclosed in, e.g., "Patent Literature 1" and "Patent Literature 2": a light source unit having laser diodes mounted thereon is rotated to be adjusted, and then the light source unit is fixed to a light source mounting portion with screws.

However, in the above-described technique, the light source unit 1 needs to be pressed by a pressing force A against a reference plane, for example, a side wall 7a of an optical housing 7, of the light source mounting portion with a turning jig at the time of rotational adjustment (see FIG. 10). At this time, the pressing causes the inclination of the light source mounting portion, as shown by dotted line in FIG. 10. In the case where adjustment and fixation are performed in a state in which the inclination exists as described above, when the turning jig is detached after the adjustment and the fixation, the inclination of the light source mounting portion returns to an original state. Accordingly, the amount of inclination of the light source mounting portion at the time of the adjustment differs from that after the fixation, and the inclination of the optical axis occurs. Thus, the distance and position of projected light are changed. In the case of a writing system, there has been the problem that the quality of a written image is lowered.

Accordingly, as a technique for preventing the inclination of the light source mounting portion, the following technique has been disclosed in, e.g., "Patent Literature 3": reinforcing ribs are placed near an opening provided in a side wall of an optical box to which the light source unit is mounted, thereby locally reinforcing the rigidity of the side wall of the optical box.

Moreover, as a technique for adjusting the pitch of the beams emitted from a plurality of laser diodes, the following technique has been disclosed in, e.g., "Patent Literature 4": by rotating a light emitting element while pressing the light emitting element against an optical housing, the beam pitch is adjusted, and the light emitting element is fixed in place.

Moreover, as a technique for preventing a laser diode from falling off, the following technique has been disclosed in, e.g., "Patent Literature 5": nails are provided near an entrance of a mounting hole for a laser diode, and the insertion of a laser diode into the mounting hole causes a flange portion of the laser diode to be fixed in place with the nails. In this technique, distortion by press-fitting does not occur, and therefore another member is not needed. Thus, cost reduction can be achieved.

However, in the technique disclosed in "Patent Literature 3", the rigidity is locally enhanced, but the influence of the inclination is not completely eliminated. With regard to the accuracy of beam pitch on a photoreceptor, errors must be extremely severely managed to such an extent that the permissible error is several micrometers or less. Accordingly, sufficient accuracy cannot be achieved.

Moreover, in the technique disclosed in "Patent Literature 4", as shown in FIG. 28, even if the beam pitch is adjusted, there has been the problem that a side wall 7a of an optical housing 7 is inclined inward as indicated by broken lines in FIG. 28 by the action of a pressing force A of a turning jig holding a light emitting element 9, and therefore the adjustment of the beam spacing is not correctly performed (reference numeral 7b denotes a reference plane to be used to mount the light emitting element 9). In particular, recently, relatively easily deformable optical housings made of resin have been frequently used for the sake of cost reduction and weight reduction. Accordingly, when a pressing force of a turning jig is released after adjustment, an optical housing returns to an original shape, and the optical axis and the beam pitch change from those at the time of the adjustment.

Moreover, in the technique disclosed in "Patent Literature 5", the nails for fixation are placed inward of the flange portion of the laser diode. Accordingly, in either of the case where the laser diode is inserted or the case where the laser diode is detached, loads are placed on the nails, and the nails may be broken. The Patent Literatures as mentioned above are listed below.

SUMMARY OF THE INVENTION

An object of the present invention is to provide a light emitting element adjusting and fixing structure in which the optical axis and beam pitch of a light emitting element at the time of fixation can be prevented from changing from those at the time of adjustment.

To accomplish the above object, a light emitting element adjusting and fixing structure according to one embodiment of the present invention includes a light emitting element having a plurality of light emitting points is fixed to a housing with a holding member. The housing includes a mounting hole having a reference plane to which the light emitting element is mounted, and a holding portion for holding the holding member such that the light emitting element can be rotated in contact with the reference plane. A distance between the adjacent light emitting points in a projection plane of the light emitting points can be adjusted by rotationally adjusting the light emitting element with respect to an optical axis in a state in which the holding member is held by the holding portion, and then fixing the light emitting element to the housing.

BRIEF DESCRIPTION OF THE DRAWINGS

FIG. 21 is a flowchart for explaining a light emitting element adjusting and fixing procedure in the another embodiment of the present invention.

FIG. 22 is a schematic view showing a mounted state of the light emitting element to be used in the another embodiment of the present invention.

DETAILED DESCRIPTION OF THE PREFERRED EMBODIMENTS

Figure 1:
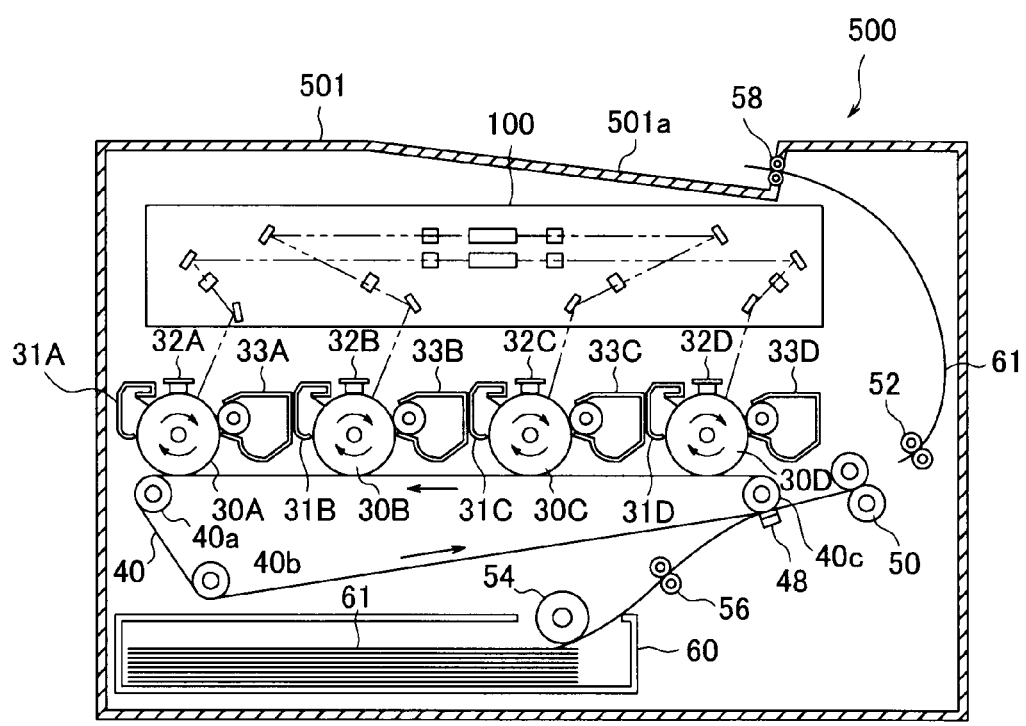
FIG. 1 is a schematic front view of an image forming apparatus to which one embodiment of the present invention can be applied.

FIG. 1 shows an image forming apparatus in which one embodiment of the present invention is employed. In this drawing, an image forming apparatus 500 includes an optical scanner 100, four photosensitive drums 30A, 30B, 30C, and 30D, an intermediate transfer belt 40, a paper feed tray 60, a paper feed roller 54, registration roller pairs 52 and 56, fixing means 50, a delivery roller pair 58, unillustrated control means, an apparatus main body 501, and the like. On an upper surface of the apparatus main body 501, a paper output tray 501a to which printed sheets are delivered is provided. The optical scanner 100 is disposed under the paper output tray 501a. Based on image information sent from an unillustrated image reader or an external device, the optical scanner 100 scans a laser beam for a black image component across the photosensitive drum 30A, scans a laser beam for a cyan image component across the photosensitive drum 30B, scans a laser beam for a magenta image component across the photosensitive drum 30C, and scans a laser beam for a yellow image component across the photosensitive drum 30D.

The photosensitive drums 30A, 30B, 30C, and 30D are provided next to one another under the optical scanner 100. Each of the photosensitive drums 30A, 30B, 30C, and 30D is rotationally driven in the clockwise direction in FIG. 1 by unillustrated drive means. Around the photosensitive drum 30A, charging means 32A, developing means 33A, and cleaning means 31A are arranged. The charging means 32A charges the surface of the photosensitive drum 30A to a predetermined voltage. The developing means 33A has a cartridge filled with a toner for a black component, a developing roller, and the like. The cleaning means 31A has a cleaning blade contacting with the surface of the photosensitive drum 30A and cleans the surface of the photosensitive drum 30A. Around each of the other photosensitive drums 30B, 30C, and 30D, except for the color of a toner stored in developing means, similar structures are arranged. The developing means 33B has a toner for a cyan component stored therein, the developing means 33C has a toner for a magenta component stored therein, and the developing means 33D has a toner for a yellow component stored therein.

The intermediate transfer belt 40 in the form of an endless belt is passed over driven rollers 40a and 40c and a drive roller 40b to be placed such that an upper surface of the intermediate transfer belt 40 is in contact with the photosensitive drums 30A, 30B, 30C, and 30D, and is driven for running in the direction indicated by arrows in FIG. 1 by being rotationally driven by the drive roller 40b. At a position facing the driven roller 40c across the intermediate transfer belt 40, a transfer charger 48 as transfer means for applying a voltage of polarity opposite to that of the charging means 32A, 32B, 32C, and 32D to the intermediate transfer belt 40 is placed close to the intermediate transfer belt 40 at a predetermined distance therefrom.

Under the intermediate transfer belt 40, the paper feed tray 60 is disposed in which a plurality of sheets of paper 61 are stored. To the upper right of the paper feed tray 60 in FIG. 1, the paper feed roller 54 is disposed by which the sheets 61 are fed separately, one by one. The sheet 61 fed from inside the paper feed tray 60 by the paper feed roller 54 is fed toward a gap between the transfer belt 40 and the transfer charger 48 through the registration roller pair 56.

On the downstream side, in the paper transport direction, of the place where the transfer belt 40 and the transfer charger 48 are close to each other, the fixing means 50 including a roller pair of a pressure roller and a heating roller is disposed. The fixing means 50 fixes a toner image transferred onto the sheet 61 by heat and pressure. The sheet 61 after fixation is transported through the registration roller pair 52 to the delivery roller pair 58 including a pair of rollers to be sequentially delivered onto the paper output tray 501a.

Figure 2:
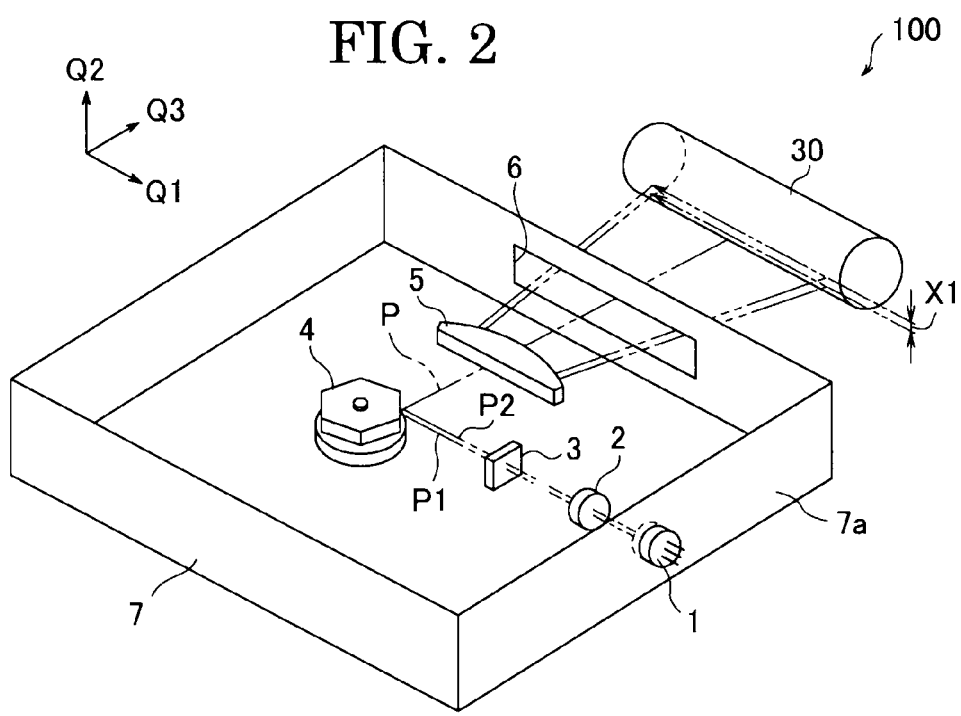
FIG. 2 is a schematic view for explaining an optical scanner to be used in the one embodiment of the present invention.

As shown in FIG. 2, the optical scanner 100 causes two laser beams P1 and P2, which are a plurality of light emitting points, to be generated from a light emitting element 1. Each of the beams P1 and P2 is collimated by a collimating lens 2, and is then applied to a reflecting surface of a polygon mirror 4, which is scanning means, via a cylindrical lens 3 to be imaged onto a photosensitive drum 30 via an fθ lens 5 and an exit window 6. At this time, the laser beams P1 and P2 guided onto the photosensitive drum 30 are scanned in a fast scan direction Q1 with a predetermined pitch X1 in a slow scan direction Q2 orthogonal to the fast scan direction Q1 by the rotation of the polygon mirror 4. In a laser scanning optical device using the light emitting element 1, writing is performed by simultaneously scanning multiple lines on the photosensitive drum 30.

The collimating lens 2, the cylindrical lens 3, the polygon mirror 4, the fθ lens 5, and the like are mounted to a bottom wall of an optical housing 7 mounted to the apparatus main body 501, and the light emitting element 1 is mounted to a side wall 7a of the optical housing 7. After optical components are mounted to the optical housing 7, an opening in an upper portion of the optical housing 7 is closed with an unillustrated lid member. It should be noted that the mounting of the light emitting element 1 to the side wall 7a will be described later.

Hereinafter, the operation of the image forming apparatus 500 including the above-described optical scanner 100 will be described. When image information is sent from an external device or the like, the laser beams P1 and P2 emitted from the light emitting element 1 is focused on a reflecting surface of the polygon mirror 4 by the collimating lens 2 and the cylindrical lens 3. The laser beams P1 and P2 deflected by the polygon mirror 4 are focused through the fθ lens 5 on the surface of the photosensitive drum 30A. Similarly, laser beams emitted from unillustrated other light emitting elements are each deflected by a polygon mirror, and are focused on the surfaces of the other photosensitive drums 30B, 30C, and 30D, respectively. At this time, the laser beams from the optical scanner 100 enter writing areas of the respective photosensitive drums 30A to 30D in the state of being adjusted to a preset intensity.

By charging photosensitive layers provided on the respective surfaces of the photosensitive drums 30A, 30B, 30C, and 30D to a predetermined voltage by the charging means 32A, 32B, 32C, and 32D, charges are distributed therein with a uniform density. When each of the photosensitive drums 30A, 30B, 30C, and 30D is scanned as described above, a portion of the photosensitive layer on which a laser beam has been focused comes to have conductivity and have an electric potential of approximately zero. Thus, when the surface of each of the photosensitive drums 30A, 30B, 30C, and 30D is scanned by a laser beam while the photosensitive drums 30A, 30B, 30C, and 30D are rotating in the direction indicated by the arrows in FIG. 1, an electrostatic latent image is formed on the surface of each of the photosensitive drums 30A, 30B, 30C, and 30D.

When the electrostatic latent images are formed on the surfaces of the photosensitive drums 30A, 30B, 30C, and 30D, toners are supplied to the surfaces of the photosensitive drums 30A, 30B, 30C, and 30D by the developing rollers included in the developing means 33A, 33B, 33C, and 33D, respectively. The supplied toners electrostatically adhere to the electrostatic latent images on the photosensitive drums 30A, 30B, 30C, and 30D, respectively. The electrostatic latent images are converted to visible images by the toners of the respective colors. The toner images as visible images are transferred onto the surface of the intermediate transfer belt 40 in a superimposed manner, and a full color toner image is formed on the intermediate transfer belt 40. The formed full color toner image is transferred in full by the actuation of the transfer charger 48 onto a surface of the sheet 61 fed from the paper feed tray 60. The sheet 61 having the image transferred thereon is transported to the fixing means 50, and the transferred image is fixed. Thus, the sheet 61 is delivered onto the paper output tray 501a by the delivery roller pair 58.

Here, a mounting arrangement of the light emitting element 1, which is a feature of the present invention, will be described. In the above-described optical scanner 100, since writing is simultaneously performed on multiple lines on each of the photosensitive drums 30A to 30D, the rotational adjustment of the light emitting element 1 needs to be performed so that the predetermined pitch X1 on each of the photosensitive drums 30A to 30D is satisfied. In this rotational adjustment, the spacing between the light emitting points is adjusted by rotating the light emitting element 1 about the direction of the optical axis.

Figure 3:
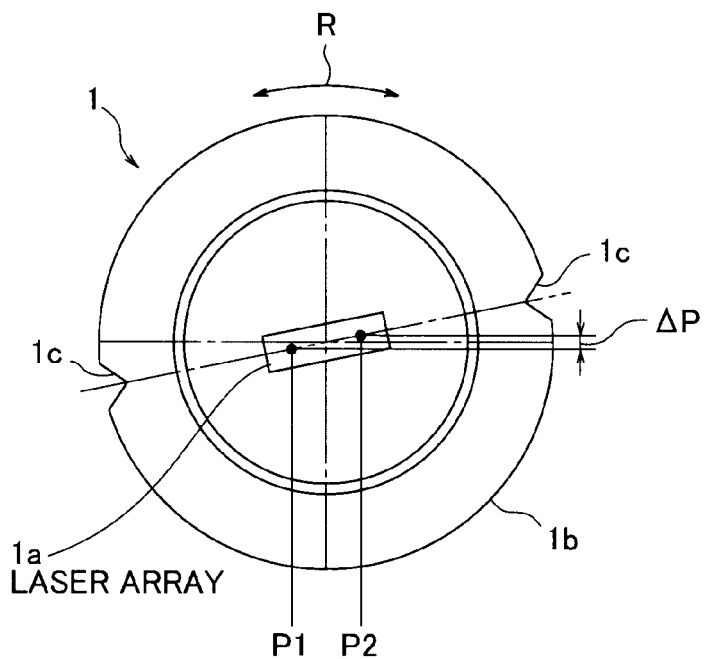
FIG. 3 is a schematic view for explaining the adjustment of a light emitting element in the one embodiment of the present invention.

FIG. 3 shows the two-beam light emitting element 1. The light emitting element 1 is obtained by packaging a laser array 1a having two light emitting points P1 and P2. The package has a flange 1b. In the flange portion 1b, two cut-away portions 1c on a straight line connecting the light emitting points P1 and P2 is provided. By rotationally adjusting the light emitting element 1 in the direction of arrow R shown in FIG. 3, the spacing ΔP between the light emitting points P1 and P2 in the slow scan direction Q2 is adjusted so that the predetermined pitch X1 is satisfied.

Figure 4:
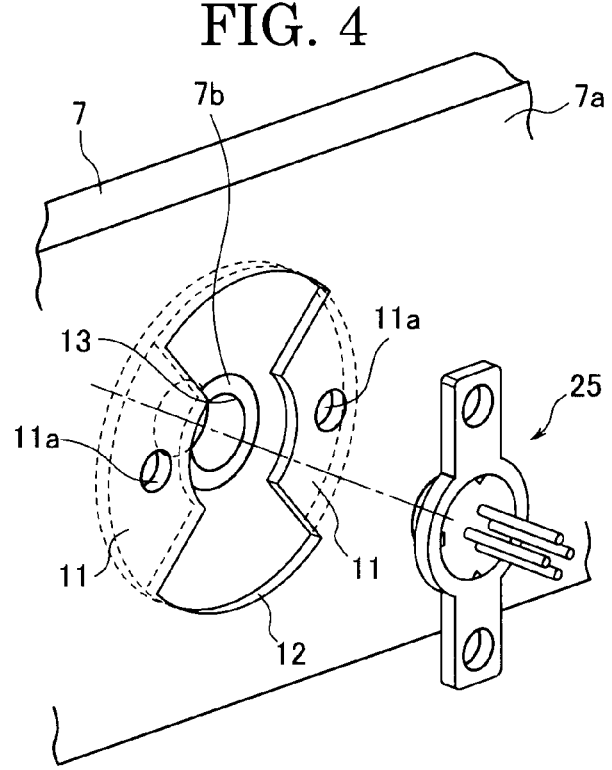
FIG. 4 is a schematic view for explaining a light emitting element adjusting and fixing structure to be used in the one embodiment of the present invention.
Figure 9:
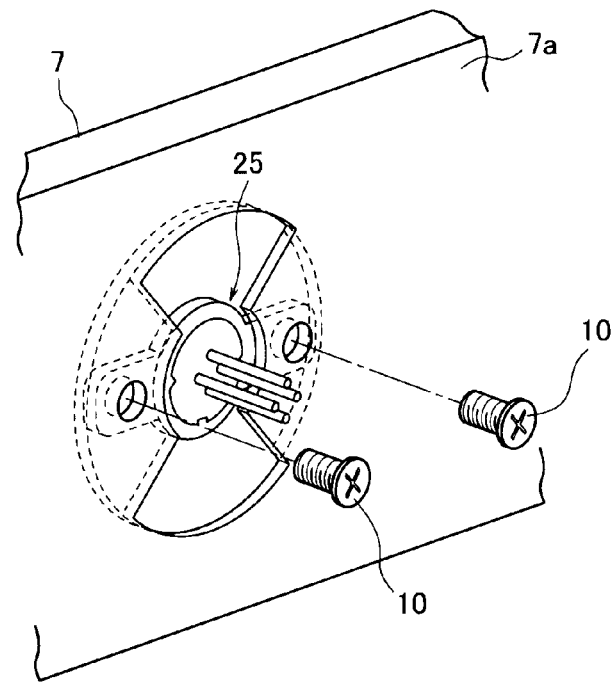
FIG. 9 is a schematic view for explaining the light emitting element adjusting and fixing procedure in the one embodiment of the present invention.

As shown in FIG. 4, the side wall 7a has a mounting hole 13 to which the light emitting element 1 is mounted; a reference plane 7b which is formed integrally with the mounting hole 13 and which is used to position the light emitting element 1 in the direction of the optical axis when the light emitting element 1 is mounted; and holding portions 11, a circular recessed portion 12, and an unillustrated threaded hole which are formed integrally with the side wall 7a. In the holding portions 11, holes 11a through which fixing screws 10 shown in FIG. 9 are inserted are drilled, respectively. The circular recessed portion 12 has an outside diameter which allows the rotation of an undermentioned holding member 21 about the mounting hole 13. The holding portions 11 are formed to be sufficiently thin compared to the thickness of the side wall 7a, and are formed in such a shape that the circular recessed portion 12 is covered. Between surfaces of the holding portions 11 on the circular recessed portion 12 side and a surface of the circular recessed portion 12 on the holding portion 11 side, gaps are provided which are slightly larger than the thicknesses of undermentioned collar portions 21b of the holding member 21 so that the holding member 21 can nicely move between the holding portions 11 and the circular recessed portion 12. The above-described holes 11a, unillustrated threaded hole, and mounting hole 13 are arranged to be positioned on a single straight line parallel to the fast scan direction Q1.

Figure 5:
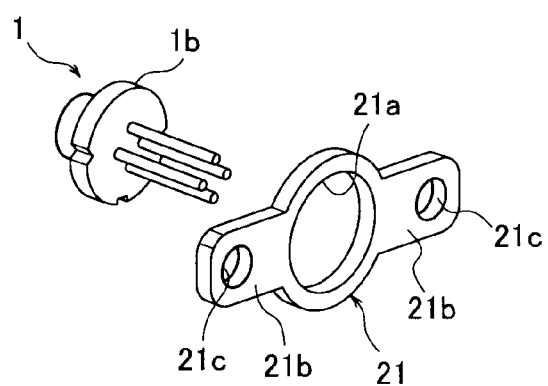
FIG. 5 is a schematic view for explaining a light source unit to be used in the one embodiment of the present invention.

As shown in FIG. 5, the flange portion 1b of the light emitting element 1 is press-fitted into and held in a holding hole 21a of the holding member 21, which has the holding hole 21a, the two collar portions 21b, holes 21c drilled in the respective collar portions 21b. The light emitting element 1 and the holding member 21 constitute a light source unit 25 shown in FIG. 4. The light emitting element 1 is held by the holding member 21 in a condition in which a light emitting-side end face (back-side surface in FIG. 5) of the flange portion 1b protrudes beyond the holding member 21, and is configured such that the amount of the protrusion corresponds to the height of a step between the circular recessed portion 12 and the reference plane 7b. At the time of press-fitting, to ensure that the predetermined pitch X1 is 20 μm, press-fitting is performed such that the angle between a straight line connecting the centers of the holes 21c and a straight line connecting the cut-away portions 1c becomes 6 to 7 degrees in this embodiment. Although the angle is 6 to 7 degrees in this configuration, this angle is changed in accordance with a set value of the predetermined pitch X1.

Figure 6:
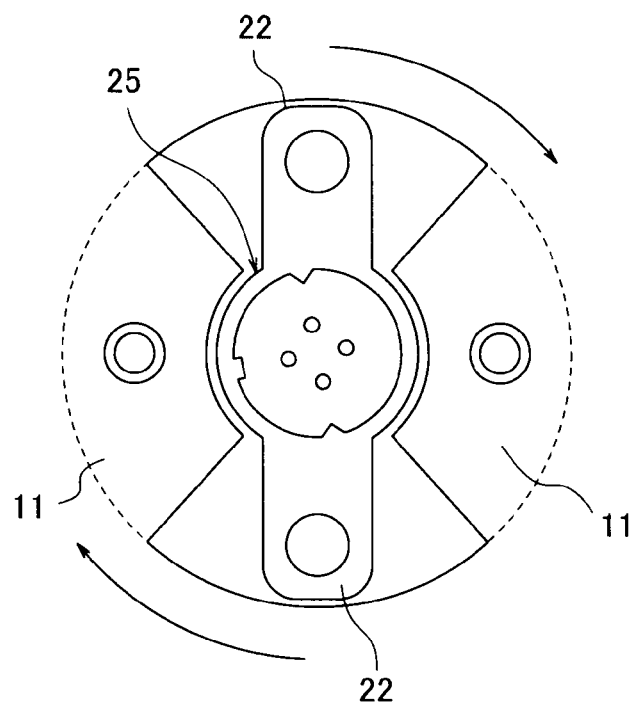
FIG. 6 is a schematic view for explaining a light emitting element adjusting and fixing procedure in the one embodiment of the present invention.
Figure 7:
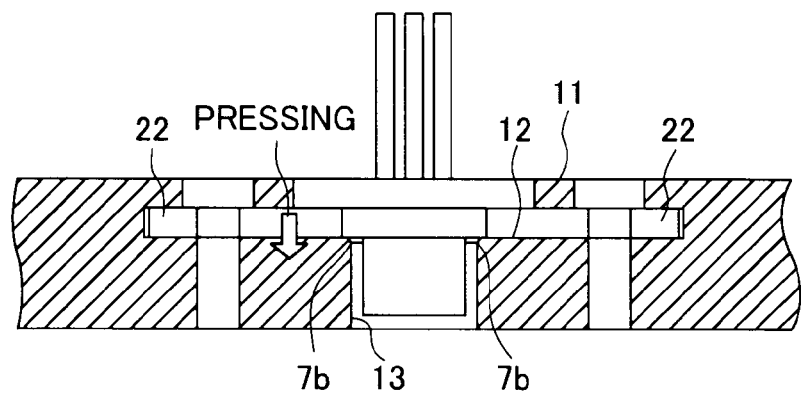
FIG. 7 is a schematic view for explaining the light emitting element adjusting and fixing procedure in the one embodiment of the present invention.
Figure 8:
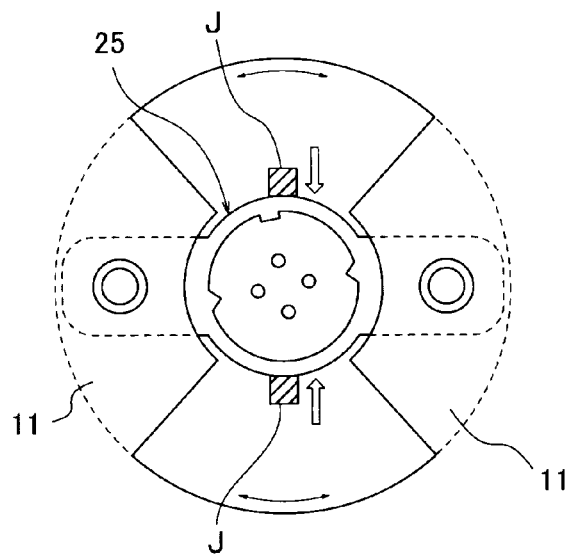
FIG. 8 is a schematic view for explaining the light emitting element adjusting and fixing procedure in the one embodiment of the present invention.

Next, a procedure for mounting and adjusting the light source unit 25 including the light emitting element 1 with respect to the side wall 7a will be described. First, the light source unit 25 is inserted into the mounting hole 13. Next, as shown in FIG. 6, the light source unit 25 is rotated about the optical axis to slide the collar portions 21b into the gaps between the surfaces of the holding portions 11 on the circular recessed portion 12 side and the surface of the circular recessed portion 12 on the holding portion 11 side as shown in FIG. 7, respectively. At this time, the collar portions 21b are respectively fastened by the holding portions 11, and the light source unit 25 is fixed in place in the direction of the optical axis in a state in which the flange portion 1b is in contact with the reference plane 7b. Then, as shown in FIG. 8, the light source unit 25 is chucked by a turning jig J, and the light source unit 25 is rotated about the optical axis to adjust the beam spacing. After the adjustment, as shown in FIG. 9, the holding member 21 is fixed to the side wall 7a with the fixing screws 10. At the time of fixation, since the thicknesses of the holding portions 11 are sufficiently smaller than that of the side wall 7a and therefore have low rigidity, the deformation of the side wall 7a at the time of fixation is small. Thus, the optical axis is prevented from tilting due to the deformation of the side wall 7a at the time of fixation.

Figure 10:
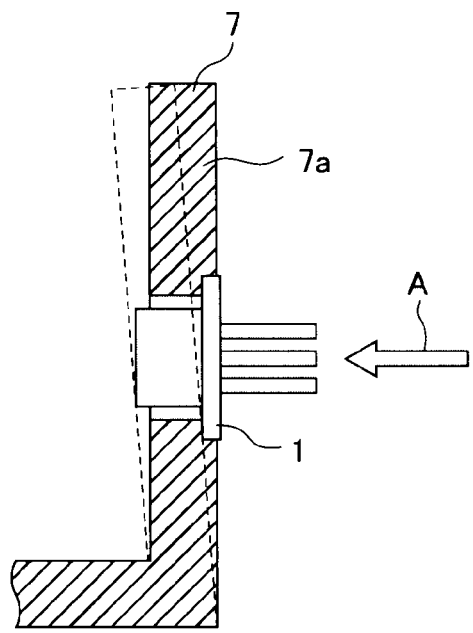
FIG. 10 is a schematic view showing a problem of the prior art.

In the above-described configuration, the holding portions 11 cause the light source unit 25 to be positioned in contact with the reference plane 7b. Accordingly, unlike the conventional art shown in FIG. 10, it is unnecessary to press the light emitting element 1 or a turning jig itself against the side wall 7a with the turning jig. Accordingly, the side wall 7a is not subject to an unnecessary external force and therefore not elastically deformed. Thus, it is possible to prevent the occurrence of the problem that the elastic deformation of the side wall 7a affects the adjustment of the beam spacing at the time of beam spacing adjustment and after fixation.

In the above-described configuration, the positions of scanning beams can be prevented from changing due to the inclination of a side wall of an optical housing. Accordingly, in the case of an optical writing system, the stability of scanning lines can be obtained, and therefore favorable image quality can be obtained. Moreover, the function of a jig for holding a light emitting element can be limited only to rotational adjustment. Accordingly, the configuration of the jig can be simplified, and cost reduction can be achieved.

Figure 11:
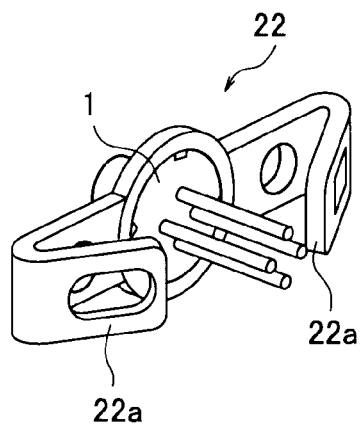
FIG. 11 is a schematic view for explaining the mounting of a light source unit to be used in a modified example of the one embodiment of the present invention.
Figure 12:
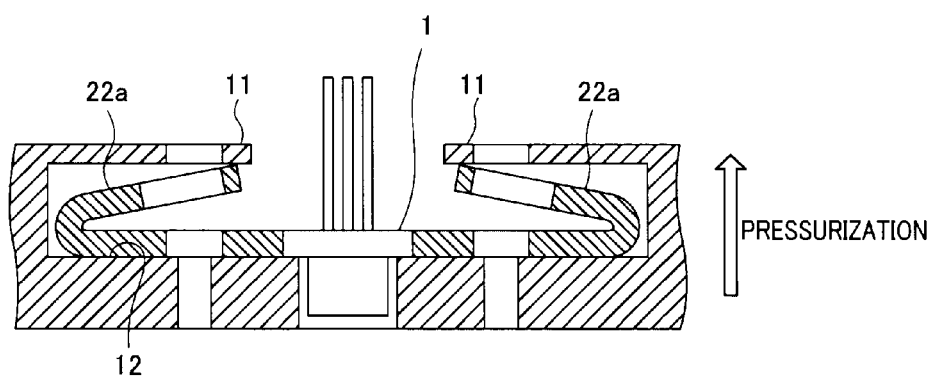
FIG. 12 is a schematic view for explaining the mounting of the light source unit to be used in the modified example of the one embodiment of the present invention.

FIG. 11 shows a modified example of the above-described embodiment of the present invention. This modified example differs from the above-described embodiment in that the holding member 21 is replaced by a holding member 22 having two collar portions 22a formed in bent shapes to be folded back, and the gaps between the surfaces of the holding portions 11 on the circular recessed portion 12 side and the surface of the circular recessed portion 12 on the holding portion 11 side are formed to be smaller than the thickness (thickness of a basal portion and a free end) of the collar portions 22a. In each of the collar portions 22a, two holes through which the fixing screw 10 is inserted are formed. This modified example has the function of pressurizing the holding portions 11 with the collar portions 22a as shown in FIG. 12 when the holding member 22 is slid into spaces between the surfaces of the holding portions 11 on the circular recessed portion 12 side and the surface of the circular recessed portion 12 on the holding portion 11 side. Accordingly, compared to the above-described embodiment, the light emitting element 1 can be reliably pressed against the reference plane 7b, and positioning accuracy can be improved.

Figure 13:
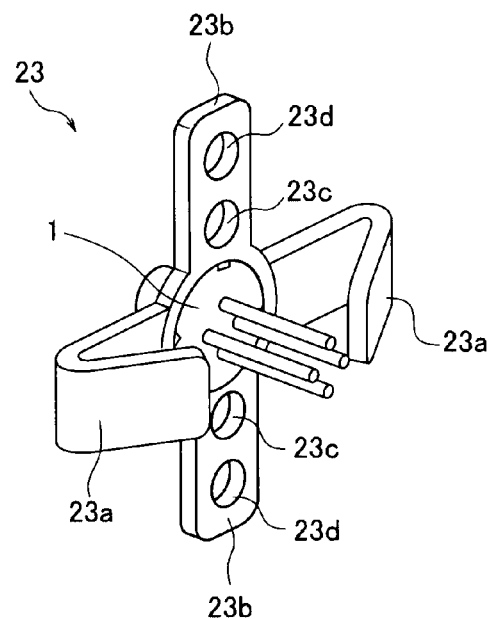
FIG. 13 is a schematic view for explaining the mounting of a light source unit to be used in another modified example of the one embodiment of the present invention.
Figure 14:
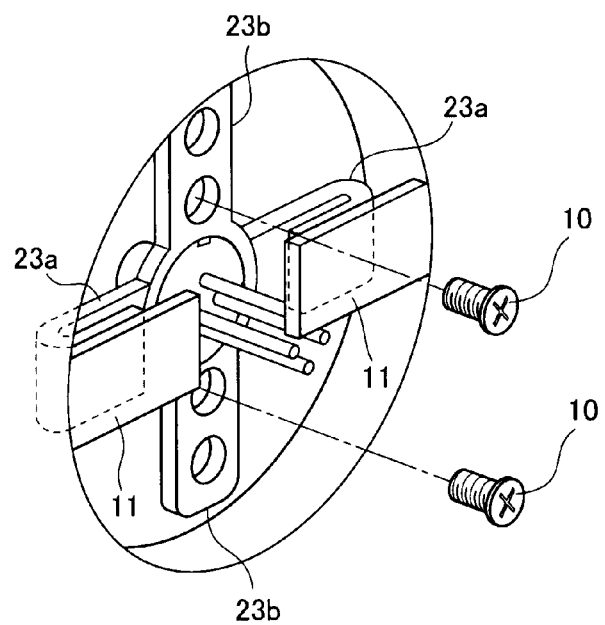
FIG. 14 is a schematic view for explaining the mounting of the light source unit to be used in the another modified example of the one embodiment of the present invention.

FIG. 13 shows another modified example of the above-described embodiment. In this example, a holding member 23 is used which has two collar portions 23a formed in bent shapes and two protruding portions 23b formed separately from the collar portions 23a. In the holding member 23, a hole 23c through which the fixing screw 10 is inserted and a mounting portion 23d for mounting a turning jig J are formed in each of the protruding portions 23b. In this case, the holding portions 11 have shapes such as shown in FIG. 14. This configuration enables the light source unit 25 to be fixed to the side wall 7a with the fixing screws 10 without the collar portions 23a interposed therebetween, which are formed in bent shapes. Accordingly, beam spacing variation at the time of fixation can be further reduced.

Figure 15:
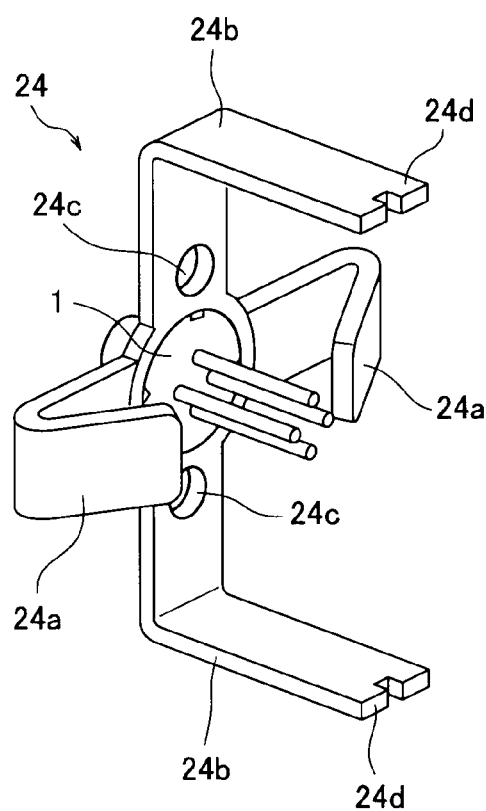
FIG. 15 is a schematic view for explaining a light source unit to be used yet another modified example of the one embodiment of the present invention.

FIG. 15 shows yet another modified example of the above-described embodiment. In this example, a holding member 24 is used which has two collar portions 24a formed in bent shapes and two protruding portions 24b formed in bent shapes separately from the collar portions 24a. In the holding member 24, a hole 24c through which the fixing screw 10 is inserted and a connecting portion 24d for a turning jig are formed in each of the protruding portions 24b. This configuration enables beam width adjustment using a simpler turning jig.

Figure 16:
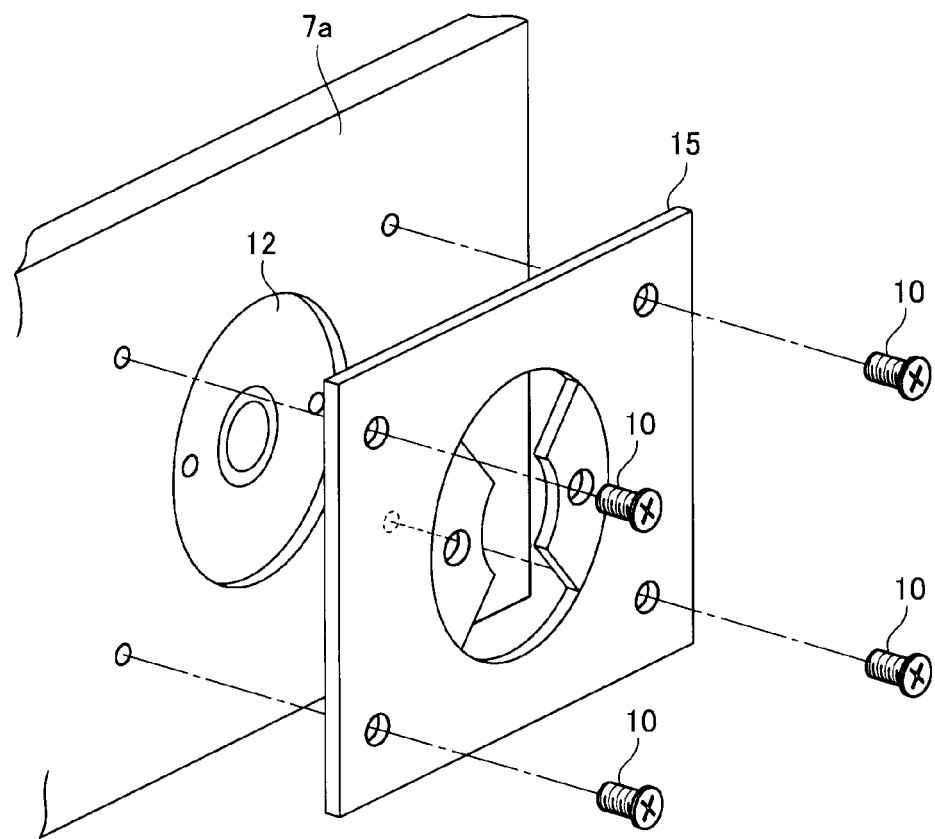
FIG. 16 is a schematic view for explaining a holding portion to be used in another modified example of the one embodiment of the present invention.

The number of laser beams is two in the above-described embodiment and the modified examples thereof, but may be three or more. Further, the number of the holding portions 11 and the number of the collar portions 21b, 22a, 23a, and 24a corresponding to the foregoing are two, but may be three or more, or one. Moreover, in the above-described embodiment and the modified examples thereof, the holding portions 11 are formed integrally with the side wall 7a. However, as shown in FIG. 16, a configuration may be employed in which a plate member 15 having the function of a holding portion is fixed to the side wall 7a. Further, the light emitting element 1 is fixed to the holding members 21, 22, 23, and 24 by press-fitting in this embodiment and the modified examples, but may be fixed by a method such as bonding, brazing, or welding instead of press-fitting. Furthermore, the light source unit 25 is fixed to the side wall 7a with the fixing screws 10 in this embodiment and the modified examples, but may be fixed by a method such as bonding, brazing, or welding instead of the foregoing.

Next, another embodiment of the present invention will be described.

Figure 17:
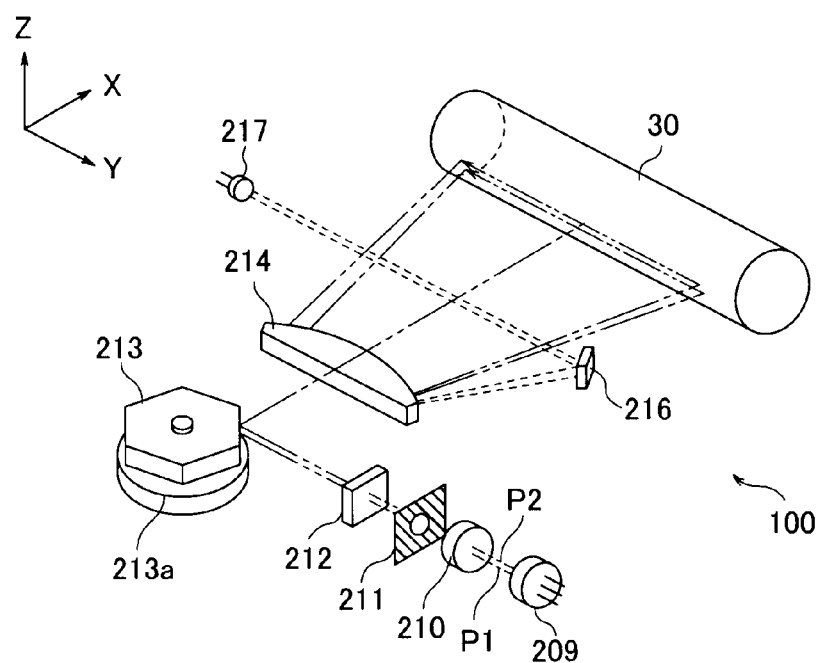
FIG. 17 is a schematic view for explaining an optical scanner to be used in another embodiment of the present invention.

As shown in FIG. 17, the optical scanner 100 of this embodiment causes the two laser beams P1 and P2, which are a plurality of light emitting points, to be generated from a light emitting element 209. Each of the beams P1 and P2 is collimated by a collimating lens 210, and is then applied to a reflecting surface 213a of a polygon mirror 213, which is scanning means, via a diaphragm 211 and a rectangular lens 212 to be imaged onto the photosensitive drum 30 via an fθ lens 214. The beams P1 and P2 enter the reflecting surface 213a in the state of being separated from each other in the Z-axis direction, which is the direction of the axis of the polygon mirror 213. Each of the beams P1 and P2 is scanned in the Y-axis direction, which is the fast scan direction. With fast scan in the Y-axis direction by the rotation of the polygon mirror 213 and slow scan in the Z-axis direction by the rotation of the photosensitive drum 30, an electrostatic latent image is formed on the surface of the photosensitive drum 30.

The rectangular lens 212 linearly focuses each of the beams P1 and P2 on the reflecting surface 213a, and has the function of preventing a point image formed on the photosensitive drum 30 from being distorted by a face tangle error of the polygon mirror 213. The fθ lens 214 has the function of preventing the distortion of the point image on the photosensitive drum 30 similar to the rectangular lens 212, and also has the function of performing correction such that the point image is scanned in the fast scan direction at a constant speed on the photosensitive drum 30.

Each of the beams P1 and P2 is branched to a space below a fast scan plane by a sensing mirror 216 at an end of the fast scan plane (XY plane) in the Y-axis direction to be guided to an optical sensor 217, converted to a write start signal in an unillustrated controller, and then outputted to the light emitting element 209. Upon receipt of the write start signal, the light emitting element 209 starts the write modulation of each of the beams P1 and P2. By adjusting the timing of write modulation of each of the beams P1 and P2 as described above, the write start (beginning) position of an electrostatic latent image formed on the photosensitive drum 30 is controlled.

Figure 18:
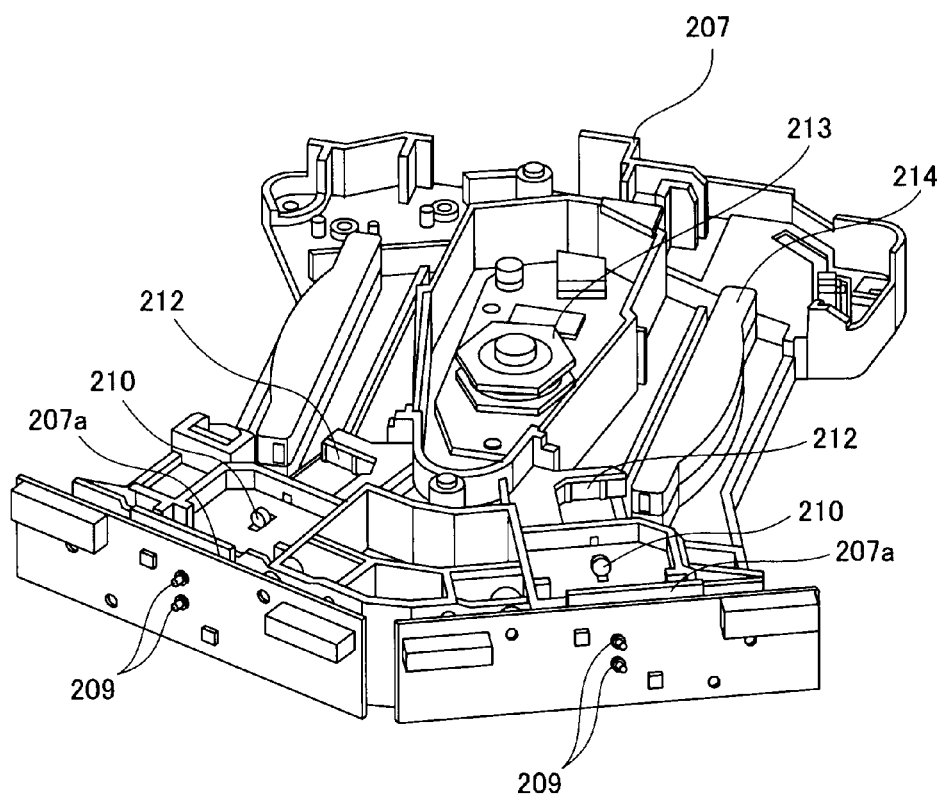
FIG. 18 is a schematic configuration diagram of the optical scanner to be used in the another embodiment of the present invention.

The rectangular lens 212, the polygon mirror 213, the fθ lens 214, and the like are mounted to a bottom wall of an optical housing 207 shown in FIG. 18 mounted to the apparatus main body 501, and the light emitting element 209 is mounted to a side wall 207a of the optical housing 207. After optical components are mounted to the optical housing 207, an opening in an upper portion of the optical housing 207 is closed with an unillustrated lid member. It should be noted that the mounting of the light emitting element 209 to the side wall 207a will be described later.

Hereinafter, the operation of the image forming apparatus 500 including the above-described optical scanner 100 will be described. When image information is sent from an external device or the like, the laser beams P1 and P2 emitted from the light emitting element 209 are focused on the reflecting surface 213a of the polygon mirror 213 by the collimating lens 210, the diaphragm 211, and the rectangular lens 212. The laser beams P1 and P2 deflected by the polygon mirror 213 are focused through the fθ lens 214 on the surface of the photosensitive drum 30A. Similarly, laser beams emitted from unillustrated other light emitting elements are each deflected by a polygon mirror, and are focused on the surfaces of the other photosensitive drums 30B, 30C, and 30D, respectively. At this time, the laser beams from the optical scanner 100 enter writing areas of the respective photosensitive drums 30A to 30D in the state of being adjusted to a preset intensity.

By charging photosensitive layers provided on the respective surfaces of the photosensitive drums 30A, 30B, 30C, and 30D to a predetermined voltage by the charging means 32A, 32B, 32C, and 32D, charges are distributed therein with a uniform density. When each of the photosensitive drums 30A, 30B, 30C, and 30D is scanned as described above, a portion of the photosensitive layer on which a laser beam has been focused comes to have conductivity and have an electric potential of approximately zero. Thus, when the surface of each of the photosensitive drums 30A, 30B, 30C, and 30D is scanned by a laser beam while the photosensitive drums 30A, 30B, 30C, and 30D are rotating in the direction indicated by the arrows in FIG. 1, an electrostatic latent image is formed on the surface of each of the photosensitive drums 30A, 30B, 30C, and 30D.

When the electrostatic latent images are formed on the surfaces of the photosensitive drums 30A, 30B, 30C, and 30D, toners are supplied to the surfaces of the photosensitive drums 30A, 30B, 30C, and 30D by the developing rollers included in the developing means 33A, 33B, 33C, and 33D, respectively. The supplied toners electrostatically adhere to the electrostatic latent images on the photosensitive drums 30A, 30B, 30C, and 30D, respectively. The electrostatic latent images are converted to visible images by the toners of the respective colors. The toner images as visible images are transferred onto the surface of the intermediate transfer belt 40 in a superimposed manner, and a full color toner image is formed on the intermediate transfer belt 40. The formed full color toner image is transferred in full by the actuation of the transfer charger 48 onto a surface of the sheet 61 fed from the paper feed tray 60. The sheet 61 having the image transferred thereon is transported to the fixing means 50, and the transferred image is fixed. Thus, the sheet 61 is delivered onto the paper output tray 501a by the delivery roller pair 58.

Figure 19:
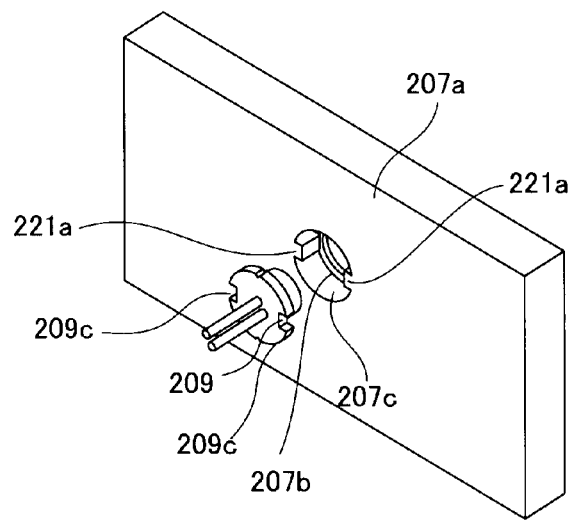
FIG. 19 is a schematic view for explaining a light emitting element adjusting and fixing structure to be used in the another embodiment of the present invention.
Figure 20:
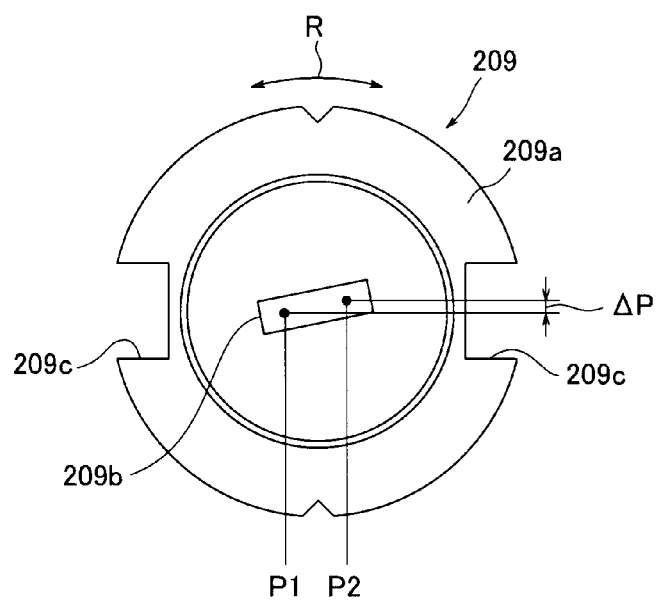
FIG. 20 is a schematic view for explaining the adjustment of a light emitting element in the another embodiment of the present invention.

Here, a mounting arrangement of the light emitting element 9, which is a feature of the present invention, will be described. As shown in FIG. 19, the side wall 207a has a mounting hole 207c to which the light emitting element 209 is mounted, a reference plane 207b which is formed integrally with the mounting hole 207c and which is used to position the light emitting element 209 in the direction of the optical axis when the light emitting element 209 is mounted, and holding portions 221a formed integrally with the mounting hole 207c. As shown in FIG. 20, in the light emitting element 209, a flange portion 209a and a laser array 209b for generating the laser beams P1 and P2 are provide integrally therewith. The holding portions 221a are formed at two positions of the bore of the mounting hole 207c in a protruding manner, and provided such that a space is created between surfaces of the holding portions 221a on the reference plane 207b side and the reference plane 207b. The flange portion 209a is formed such that the outside diameter thereof is of a size which allows the rotation of the light emitting element 209 when the light emitting element 209 is inserted into the mounting hole 207c. The flange portion 209a is formed to have a thickness slightly smaller than the thickness of the space between surfaces of the holding portion 221a on the reference plane 207b side and the reference plane 207b, and to have a thickness which allows the light emitting element 209 to nicely rotate in the space. Moreover, in the flange portion 209a, cut-away portions 209c for avoiding interference with the holding portions 221a when the light emitting element 209 is inserted into the mounting hole 207c are provided at positions corresponding to the respective holding portions 221a. In this embodiment, the cut-away portions 209c are provided at two opposite positions and have rectangular shapes. However, the positions, number, and shapes of the cut-away portions 209c are not limited to the foregoing. The cut-away portions 209c may be provided anywhere on the periphery of the flange portion 209a, the number of the cut-away portions 209c may be one or more, and the cut-away portions 209c may be arc-shaped, wedge shaped, or the like as long as the shapes and disposed positions of the cut-away portions 209c correspond to those of the holding portions 221a.

Figure 23:
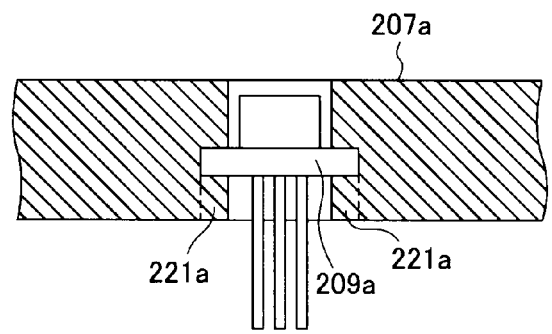
FIG. 23 is a schematic view showing a mounted state of the light emitting element to be used in the another embodiment of the present invention.
Figure 24:
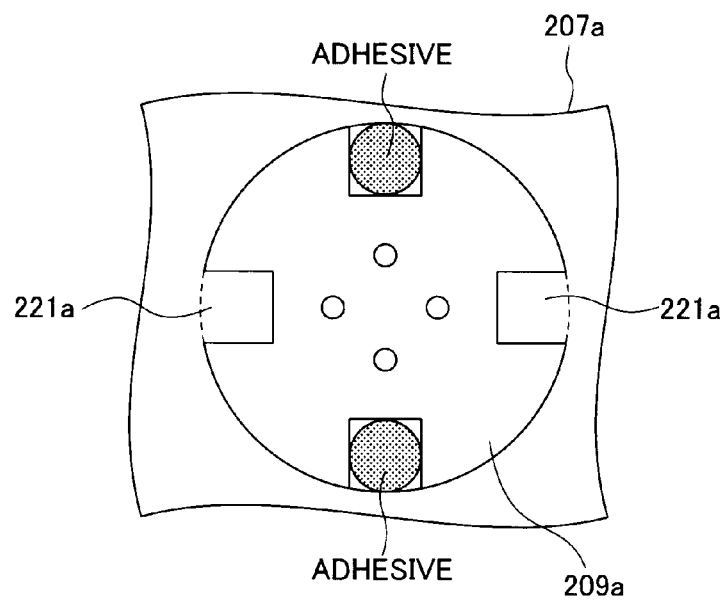
FIG. 24 is a schematic view showing a fixed state of the light emitting element to be used in the another embodiment of the present invention.
Figure 25:
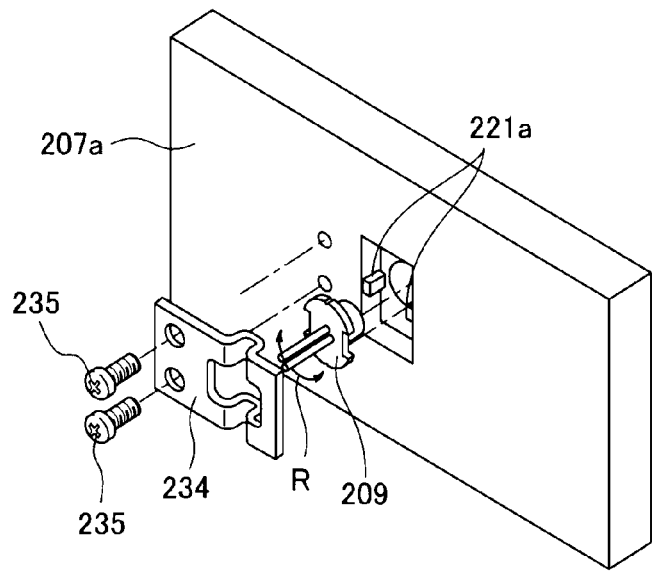
FIG. 25 is a schematic view showing a fixed state of the light emitting element to be used in the another embodiment of the present invention.

Next, a procedure for mounting and adjusting the light emitting element 209 with respect to the side wall 207a will be described with reference to FIG. 21. First, the cut-away portions 209c of the light emitting element 209 are aligned with the holding portions 221a, the light emitting element 209 is inserted into a mounting hole 207c (ST1) as shown in FIG. 22, and a bottom surface of the flange portion 209a is caused to touch the reference plane 207b (ST2) as shown in FIG. 23. Next, the light emitting element 209 is chucked by an unillustrated turning jig, and rotational adjustment is performed in which the light emitting element 209 is rotated about the optical axis (ST3). At this time, the direction of arrangement of the laser array 209b is adjusted by rotating the light emitting element 209 in the direction indicated by arrow R in FIG. 20. Thus, the operation of adjusting the beam spacing is performed to match the beam spacing ΔP between the two laser beams P1 and P2 with a design value on the photosensitive drum 30. At the time of this rotational adjustment of the light emitting element 209, the holding portions 221a can hold the light emitting element 209 such that the light emitting element 209 can be rotated in a state in which the bottom surface of the flange portion 209a is in contact with the reference plane 207b (ST4). Thus, unlike the conventional art, it is unnecessary to press the light emitting element 209 or a turning jig itself against the side wall 207a with the turning jig. Accordingly, the side wall 207a is not subject to an unnecessary external force and therefore not elastically deformed. Thus, it is possible to prevent the occurrence of the problem that the elastic deformation of the side wall 207a affects the adjustment of the beam spacing. After the adjustment of the beam spacing, as shown in FIG. 24, the cut-away portions 209c are filled with adhesive to fix the light emitting element 209 to the side wall 207a (ST5). With regard to the fixation of the light emitting element 209, instead of the above-described adhesive-based fixation, as shown in FIG. 25, a fixing member 234 for fixing the light emitting element 209 in place may be prepared to employ a configuration in which the light emitting element 209 is fixed in place by fixing the fixing member 234 to the side wall 207a with screws 235.

In the above-described configuration, the positions of scanning beams can be prevented from changing due to the inclination of a side wall of an optical housing. Accordingly, in the case of an optical writing system, the stability of scanning lines can be obtained, and therefore favorable image quality can be obtained. Moreover, the function of a jig for holding a light emitting element can be limited only to rotational adjustment. Accordingly, the configuration of the jig can be simplified, and cost reduction can be achieved. Moreover, by fixing light emitting elements in place by bonding, component cost can be reduced. Further, since the number of parts is small, the layout around the light emitting elements can be improved, and the miniaturization of a writing device can be realized. Moreover, a light emitting element can be fixed in place with a fixing member having a simple shape and screws. Accordingly, component cost can be reduced, and the simple configuration facilitates the improvement of part accuracy and reduces adjustment time. Thus, a writing device with high productivity can be provided.

Figure 26:
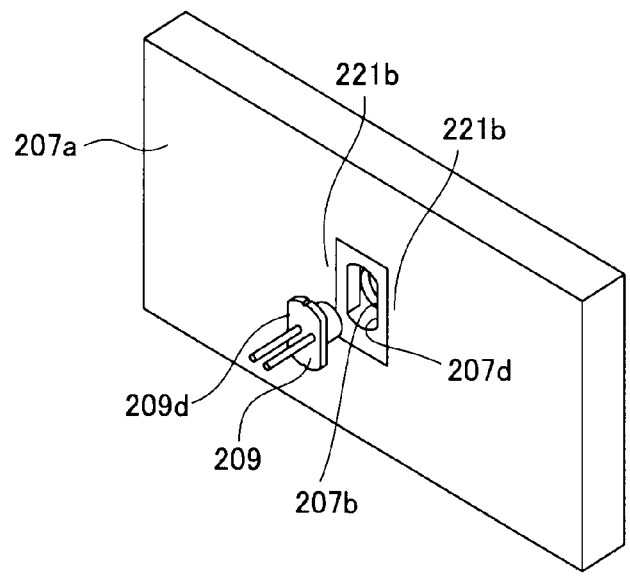
FIG. 26 is a schematic view for explaining the mounting of a light emitting element to be used in a modified example of the another embodiment of the present invention.

FIG. 26 shows a modified example of the above-described embodiment of the present invention. This modified example differs from the above-described embodiment in the following points: the flange portion 209a of the light emitting element 209 is replaced by a flange portion 209d having a shape obtained by cutting off two opposite portions from a circle along straight lines; and the mounting hole 207c formed in the side wall 207a is replaced by a mounting hole 207d having a shape similar to that of the flange portion 209d and a size slightly larger than that of the flange portion 209d on the side from which the light emitting element 209 is inserted, having the reference plane 207b inside, and having a circular space having a slightly larger thickness than the flange portion 209d between the reference plane 207b and a surface of the side wall 207a on the side from which the light emitting element 209 is inserted. In this modified example, by inserting the light emitting element 209 into the mounting hole 207d in a condition in which the flange portion 209d is aligned with the mounting hole 207d, and rotating the light emitting element 209 in a state in which a bottom surface of the flange portion 209d is touching the reference plane 207b, a surface of the side wall 207a on the side from which the light emitting element 209 is inserted functions as a holding portion 221b. Thus, operation and effects similar to those of the above-described embodiment can be obtained.

Figure 27A:
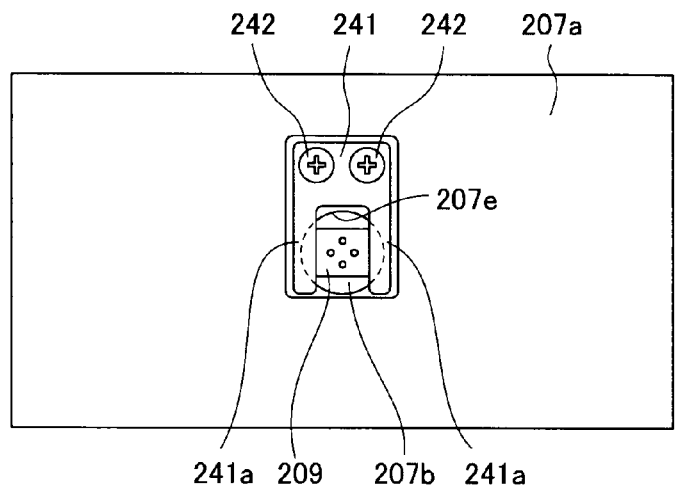
FIG. 27A is a front view for explaining the mounting of a light emitting element to be used in another modified example of the another embodiment of the present invention.
Figure 27B:
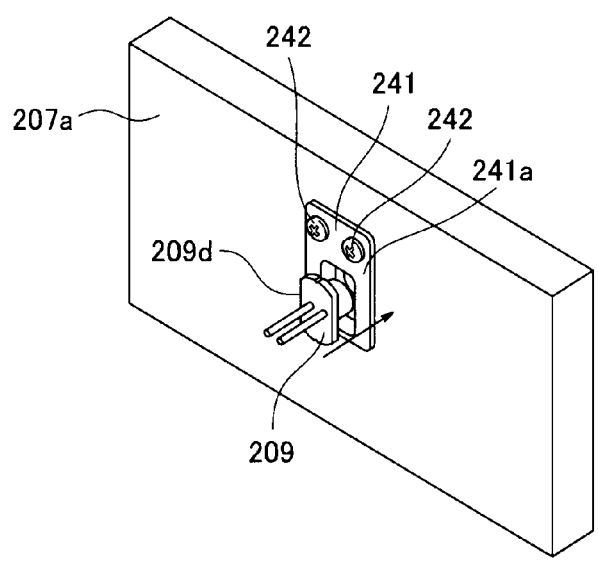
FIG. 27B is a perspective view for explaining the mounting of the light emitting element to be used in another modified example of the another embodiment of the present invention.
Figure 28:
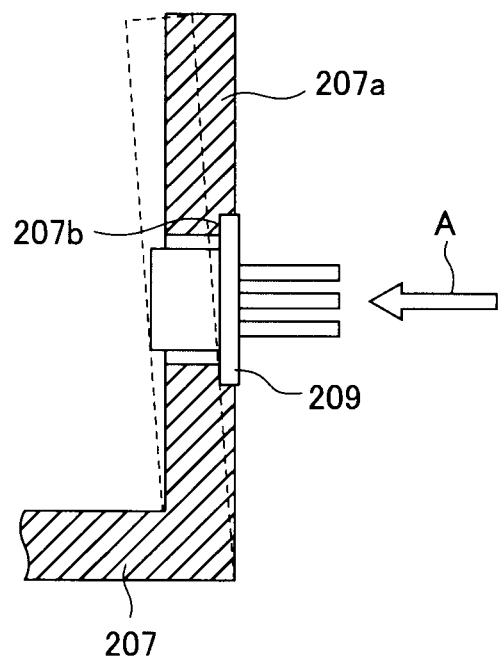
FIG. 28 is a schematic view showing a problem of the prior art.

FIG. 27 shows another modified example of the above-described embodiment. In this example, a circular mounting hole 207e having the reference plane 207b having a depth slightly larger than the thickness of the flange portion 209d is provided in the side wall 207a, and a plate member 241 having a groove portion formed to have a width slightly larger than the distance between the cut-off portions of the flange portion 209d is fixed with screws 242 to a surface of the side wall 207a on the side from which the light emitting element 209 is mounted. In this example, by inserting the light emitting element 209 into the mounting hole 207e in a condition in which the flange portion 209d is aligned with the groove portion, and rotating the light emitting element 209 in a state in which the bottom surface of the flange portion 209d is touching the reference plane 207b, a portion of the plate member 241 in which the groove portion is formed functions as a holding portion 241a. Thus, operation and effects similar to those of the above-described embodiment can be obtained. In this configuration, though the number of parts increases, the mounting hole 207e can be easily machined.

Advantageous Effects of Invention

According to the present invention, it is unnecessary to press a light emitting element or a turning jig itself holding the light emitting element against a housing with the turning jig. Accordingly, the housing is not subject to an unnecessary external force and therefore not elastically deformed. Thus, it is possible to prevent the occurrence of the problem that the elastic deformation of the housing affects the adjustment of the beam spacing. In other words, according to the present invention, the positions of scanning beams can be prevented from changing due to the inclination of a side wall of the housing. Accordingly, in the case of an optical writing system, the stability of scanning lines can be obtained, and therefore favorable image quality can be obtained.

In the above-described embodiment and the modified examples thereof, the thicknesses of the holding portions 221a, 221b, and 241a can be set in the range of not more than the thickness of the side wall 207a as desired. Accordingly, the amount of protrusion of pins of the light emitting element 209 can be determined by the thickness of the holding portion. Accordingly, a turning jig can be easily mounted. Moreover, when the light emitting element 209 is mounted to an LD (laser diode) board, the lengths of pins of the light emitting element 209 can be ensured. Accordingly, the light emitting element 209 can be easily mounted. Moreover, the number of laser beams is two in the above-described embodiment and the modified examples thereof, but may be three or more.

Although the preferred embodiments of the present invention have been described, it should be understood that the present invention is not limited to these embodiments, various modifications and changes can be made to the embodiments.

CITATION LIST

Patent Literatures

[PTL 1] Japanese Patent Application Publication No. H10-10447
[PTL 2] Japanese Patent Application Publication No. H10-319338
[PTL 3] Japanese Patent Application Publication No. H11-72728
[PTL 4] Japanese Patent Application Publication No. 2001-296490
[PTL 5] Japanese Patent Application Publication No. 2007-50540

What is claimed is:

1. A light emitting element adjusting and fixing structure in which a light emitting element having a plurality of light emitting points is fixed to a housing with a holding member that holds the light emitting element, comprising:
   the housing, which includes a planar wall including a mounting hole having a reference plane to which the light emitting element is mounted; and
   a holding portion to hold the holding member such that the light emitting element is rotated in contact with the reference plane, and
   the holding portion is provided inside a recess in the planar wall of the housing, the holding portion holds a part of the holding member in the recess during an adjustment of a distance between adjacent light emitting points in a projection plane of the light emitting points in which the light emitting element is rotationally adjusted with respect to an optical axis, and the light emitting element is fixed to the housing after the adjustment.

2. The light emitting element adjusting and fixing structure according to claim 1, wherein
   the holding member is a part provided separately from the light emitting element.

3. The light emitting element adjusting and fixing structure according to claim 2, wherein
   the holding portion is formed to have a sufficiently smaller thickness than the housing.

4. The light emitting element adjusting and fixing structure according to claim 2, wherein
   the holding member has a collar portion formed in a bent shape.

5. The light emitting element adjusting and fixing structure according to claim 2, wherein
   the holding member has a mounting portion to which a turning jig to be used in the adjustment is mounted.

6. The light emitting element adjusting and fixing structure according to claim 2, wherein
   the holding member holds the light emitting element by the light emitting element being press-fitted into the holding member.

7. The light emitting element adjusting and fixing structure according to claim 6, wherein
   the light emitting element is press-fitted into the holding member while being inclined at a predetermined angle in accordance with the distance between the adjacent light emitting points in the projection plane.

8. The light emitting element adjusting and fixing structure according to claim 1, wherein
   the holding member is a flange portion provided in the light emitting element, and the flange portion is brought into contact with the reference plane.

9. The light emitting element adjusting and fixing structure according to claim 8, wherein
   the light emitting element has a cut-away portion in the flange portion, the cut-away portion being for avoiding interference with the holding portion when the light emitting element is mounted to the housing.

10. The light emitting element adjusting and fixing structure according to claim 8, wherein
    the light emitting element is fixed to the housing with adhesive after the adjustment.

11. The light emitting element adjusting and fixing structure according to claim 8, wherein
    the light emitting element is fixed to the housing with a fixing member after the adjustment.

12. An optical scanner comprising the light emitting element adjusting and fixing structure according to claim 1.

13. An image forming apparatus comprising the optical scanner according to claim 12.

14. The light emitting element adjusting and fixing structure according to claim 1, wherein the recess is a circular recess.

15. The light emitting element adjusting and fixing structure according to claim 1, wherein the holding portion includes a flat flange that covers the part of the holding member during the adjustment of the distance.

* * * * *